(12) United States Patent
Calacal et al.

(10) Patent No.: US 12,469,992 B2
(45) Date of Patent: Nov. 11, 2025

(54) TERMINAL BLOCK AND COVER FOR ARCING MITIGATION

(71) Applicant: Hamilton Sundstrand Corporation, Charlotte, NC (US)

(72) Inventors: Mary Christelle Ann Calacal, Rockford, IL (US); Kyle S. Sirbasku, Rockford, IL (US); Edward C. Allen, Davis, IL (US); Duane C. Johnson, Beloit, WI (US); Dhaval S. Patel, Schaumburg, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 351 days.

(21) Appl. No.: 18/165,556

(22) Filed: Feb. 7, 2023

(65) Prior Publication Data

US 2024/0266764 A1    Aug. 8, 2024

(51) Int. Cl.
*H01R 9/24* (2006.01)
*H01R 13/53* (2006.01)
*H01R 43/18* (2006.01)
*H01R 43/24* (2006.01)
*H02K 5/22* (2006.01)

(52) U.S. Cl.
CPC .......... *H01R 9/2416* (2013.01); *H01R 13/53* (2013.01); *H01R 43/18* (2013.01); *H01R 43/24* (2013.01); *H02K 5/225* (2013.01); *H01R 2201/10* (2013.01); *H01R 2201/26* (2013.01)

(58) Field of Classification Search
CPC ...... H01R 9/2416; H01R 13/53; H01R 43/18; H01R 43/24; H01R 2201/10; H02K 5/225

USPC .................................. 439/709, 718
See application file for complete search history.

(56) References Cited

U.S. PATENT DOCUMENTS

| | | | |
|---|---|---|---|
| 7,973,625 B2 | 7/2011 | Chandrappa et al. | |
| 8,435,071 B2* | 5/2013 | Grosskopf | H01R 9/223 |
| | | | 439/146 |
| 8,631,571 B2 | 1/2014 | Patel et al. | |
| 8,764,494 B2* | 7/2014 | Joseph | H01R 25/162 |
| | | | 439/798 |
| 9,472,996 B2 | 10/2016 | Hochstetler et al. | |
| 9,601,975 B2 | 3/2017 | Patel et al. | |
| 10,763,722 B2 | 9/2020 | Hochstetler et al. | |

(Continued)

FOREIGN PATENT DOCUMENTS

| | | |
|---|---|---|
| EP | 2793373 A2 | 10/2014 |
| EP | 3511550 A1 | 7/2019 |

OTHER PUBLICATIONS

European Search Report for Application No. 24156333.7, mailed Jul. 1, 2024, 9 pages.

*Primary Examiner* — Gary F Paumen
(74) *Attorney, Agent, or Firm* — CANTOR COLBURN LLP

(57) ABSTRACT

The present disclosure provides for terminal block cover assemblies for electric generators, and related methods of fabrication and use. More particularly, the present disclosure provides for terminal block cover assemblies for generators for aircraft or the like, with the terminal block cover assemblies having electrical arcing mitigation features and structures, and related methods of fabrication and use. The terminal block cover assemblies of the present disclosure can be utilized to reduce electrical arcing events in environments where de-icing fluid is used in the engine cowl.

18 Claims, 10 Drawing Sheets

(56) References Cited

U.S. PATENT DOCUMENTS

| | | |
|---|---|---|
| 10,819,181 B2 * | 10/2020 | Hochstetler .............. H01R 9/24 |
| 10,833,434 B1 * | 11/2020 | Tassell, Jr. ........... H01R 9/2416 |
| 11,171,429 B2 | 11/2021 | Patel et al. |
| 2012/0133224 A1 | 5/2012 | Grosskopf et al. |
| 2013/0005195 A1 | 1/2013 | Grosskopf et al. |
| 2014/0305692 A1 * | 10/2014 | Hochstetler .............. H05K 5/03 |
| | | 174/50 |
| 2022/0200219 A1 | 6/2022 | Belisle et al. |

* cited by examiner

TERMINAL BLOCK AND COVER FOR ARCING MITIGATION

TECHNICAL FIELD

The present disclosure relates to terminal block cover assemblies for electric generators and related methods of fabrication and use and, more particularly, to terminal block cover assemblies for generators for aircraft or the like, with the terminal block cover assemblies having electrical arcing mitigation features and structures, and related methods of fabrication and use.

BACKGROUND

In general, some terminal block and cover designs for electric generators (e.g., variable frequency generators or VFGs) for aircraft or the like (e.g., Airbus A350 jet airliner) can experience in-service issues (e.g., during the winter months). For example, some existing terminal block and cover designs can have issues with electrical arcing events in environments where de-icing fluid is used in the engine cowl. The de-icing fluid can cause contamination build up that can lead to electrical arcing with exposed areas of adjacent feeder cables. This can lead to damage to the generator terminal block and cover and surrounding parts.

BRIEF DESCRIPTION

The present disclosure provides for terminal block cover assemblies for electric generators, and related methods of fabrication and use. More particularly, the present disclosure provides for terminal block cover assemblies for generators for aircraft or the like, with the terminal block cover assemblies having electrical arcing mitigation features and structures, and related methods of fabrication and use.

The present disclosure provides for a terminal block cover assembly including a terminal block cover and a terminal block, the terminal block cover and the terminal block each extending from a first side to a second side, the terminal block cover having a first mounting hole configured to mount with respect to a first mounting hole of the terminal block, and the first mounting hole of the terminal block configured to mount with respect to an electric generator, and a first terminal block stud extending from the terminal block, the first terminal block stud housed relative to the mounted terminal block cover and a first divider wall of the terminal block, and wherein an extension length section of the mounted terminal block cover extends a pre-determined distance from the first mounting hole of the terminal block cover and toward the second side to electrically isolate the first terminal block stud, and an extension length section of the mounted terminal block extends a pre-determined distance from the first mounting hole of the terminal block and toward the second side to electrically isolate the first terminal block stud.

In addition to one or more of the features described, or as an alternative to any of the foregoing embodiments, the electric generator is a variable frequency generator for aircraft, or an integrated drive generator for aircraft, or a variable speed constant frequency generator for aircraft.

In addition to one or more of the features described, or as an alternative to any of the foregoing embodiments, the first terminal block stud is configured to connect to a feeder cable that carries electrical power to a power distribution system of an aircraft.

In addition to one or more of the features described, or as an alternative to any of the foregoing embodiments, further including a second terminal block stud extending from the terminal block, the second terminal block stud housed relative to the mounted terminal block cover and the first divider wall and a second divider wall of the terminal block.

In addition to one or more of the features described, or as an alternative to any of the foregoing embodiments, further including a third terminal block stud extending from the terminal block, the third terminal block stud housed relative to the mounted terminal block cover and the second divider wall and a third divider wall of the terminal block, and a fourth terminal block stud extending from the terminal block, the fourth terminal block stud housed relative to the mounted terminal block cover and the third divider wall.

In addition to one or more of the features described, or as an alternative to any of the foregoing embodiments, wherein an extension length section of the first divider wall extends a pre-determined distance from the first mounting hole of the terminal block and toward the second side to electrically isolate the first terminal block stud.

In addition to one or more of the features described, or as an alternative to any of the foregoing embodiments, wherein a portion of the first divider wall extends from the terminal block and toward a cover surface of the mounted terminal block cover to electrically isolate the first terminal block stud.

In addition to one or more of the features described, or as an alternative to any of the foregoing embodiments, the mounted terminal block cover includes a first mating groove, the first mating groove configured to mate with a portion of the first divider wall of the terminal block.

In addition to one or more of the features described, or as an alternative to any of the foregoing embodiments, the mounted terminal block cover includes a first mating groove, the first mating groove configured to mate with a portion of the first divider wall of the terminal block, and the mounted terminal block cover includes a second mating groove, the second mating groove configured to mate with a portion of the second divider wall of the terminal block.

In addition to one or more of the features described, or as an alternative to any of the foregoing embodiments, the terminal block cover is a molded plastic component, and the terminal block is a molded plastic component, and the first terminal block stud comprises metal.

The present disclosure provides for a method for fabricating a terminal block cover assembly including providing a terminal block cover and a terminal block, the terminal block cover and the terminal block each extending from a first side to a second side, with a first terminal block stud extending from the terminal block, and mounting a first mounting hole of the terminal block with respect to an electric generator, and mounting a first mounting hole of the terminal block cover with respect to the first mounting hole of the terminal block to house the first terminal block stud relative to the terminal block cover and a first divider wall of the terminal block, and where an extension length section of the mounted terminal block cover extends a pre-determined distance from the first mounting hole of the terminal block cover and toward the second side to electrically isolate the housed first terminal block stud, and an extension length section of the mounted terminal block extends a pre-determined distance from the first mounting hole of the terminal block and toward the second side to electrically isolate the housed first terminal block stud.

In addition to one or more of the features described, or as an alternative to any of the foregoing embodiments, the electric generator is a variable frequency generator for aircraft, or an integrated drive generator for aircraft, or a variable speed constant frequency generator for aircraft.

In addition to one or more of the features described, or as an alternative to any of the foregoing embodiments, further including connecting the first terminal block stud to a feeder cable that carries electrical power to a power distribution system of an aircraft.

In addition to one or more of the features described, or as an alternative to any of the foregoing embodiments, further including a second terminal block stud extending from the terminal block, the second terminal block stud housed relative to the mounted terminal block cover and the first divider wall and a second divider wall of the terminal block.

In addition to one or more of the features described, or as an alternative to any of the foregoing embodiments, further including a third terminal block stud extending from the terminal block, the third terminal block stud housed relative to the mounted terminal block cover and the second divider wall and a third divider wall of the terminal block, and a fourth terminal block stud extending from the terminal block, the fourth terminal block stud housed relative to the mounted terminal block cover and the third divider wall.

In addition to one or more of the features described, or as an alternative to any of the foregoing embodiments, where an extension length section of the first divider wall extends a pre-determined distance from the first mounting hole of the terminal block and toward the second side to electrically isolate the first terminal block stud.

In addition to one or more of the features described, or as an alternative to any of the foregoing embodiments, where a portion of the first divider wall extends from the terminal block and toward a cover surface of the mounted terminal block cover to electrically isolate the first terminal block stud.

In addition to one or more of the features described, or as an alternative to any of the foregoing embodiments, the mounted terminal block cover includes a first mating groove, the first mating groove configured to mate with a portion of the first divider wall of the terminal block.

In addition to one or more of the features described, or as an alternative to any of the foregoing embodiments, the mounted terminal block cover includes a first mating groove, the first mating groove configured to mate with a portion of the first divider wall of the terminal block, and the mounted terminal block cover includes a second mating groove, the second mating groove configured to mate with a portion of the second divider wall of the terminal block.

In addition to one or more of the features described, or as an alternative to any of the foregoing embodiments, the terminal block cover is a molded plastic component, and the terminal block is a molded plastic component, and the first terminal block stud comprises metal.

The above described and other features are exemplified by the following figures and detailed description.

Any combination or permutation of embodiments is envisioned.

Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
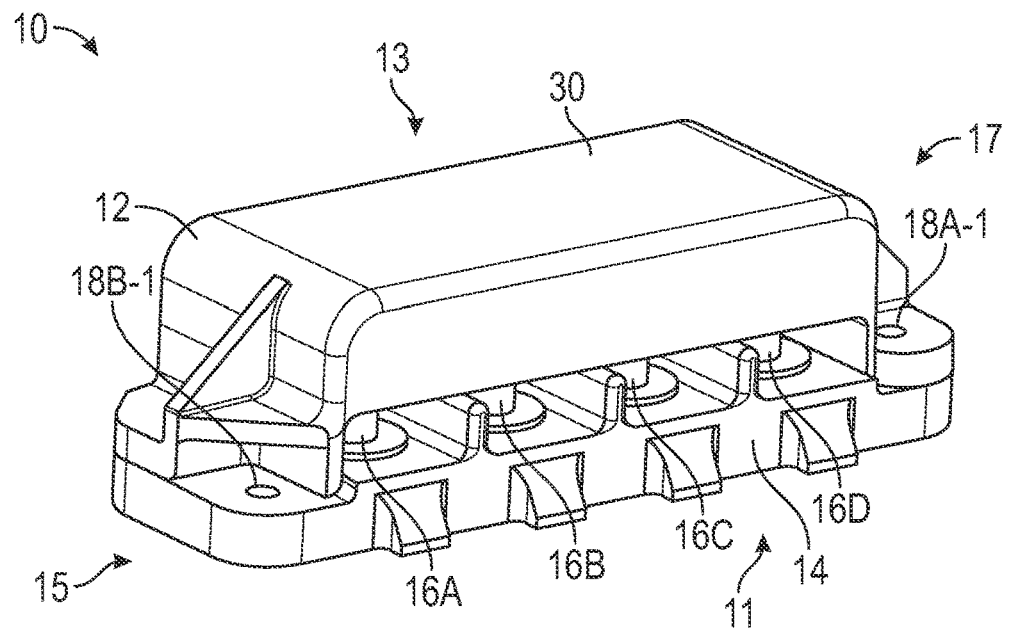
Figure 2:
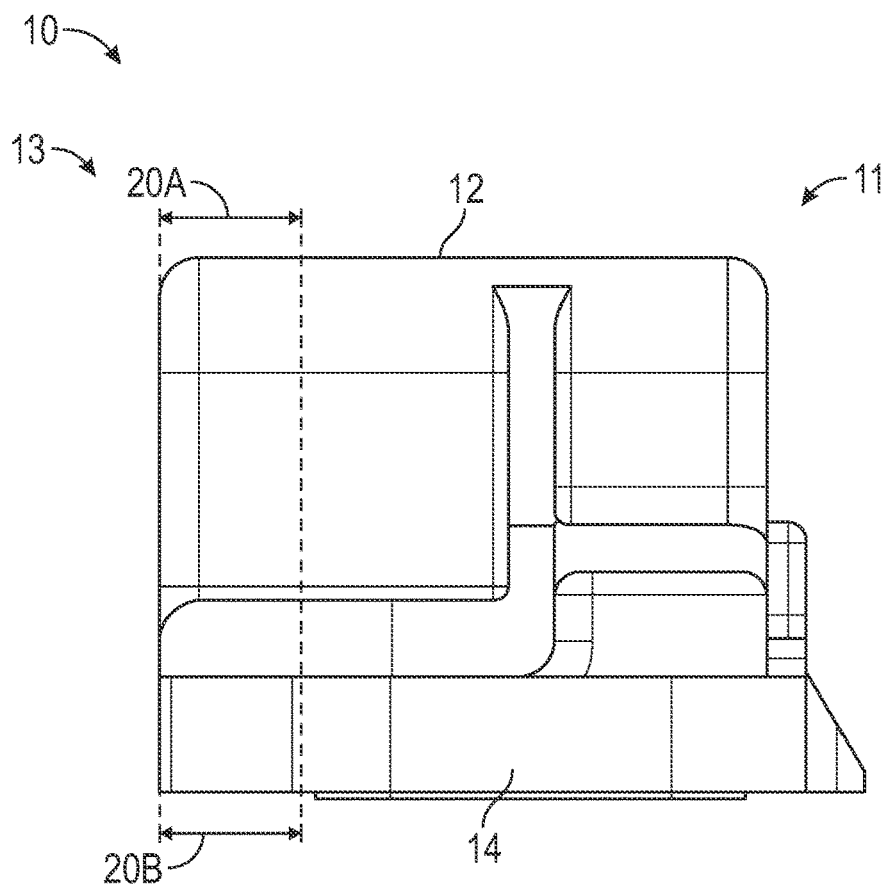
Figure 4:
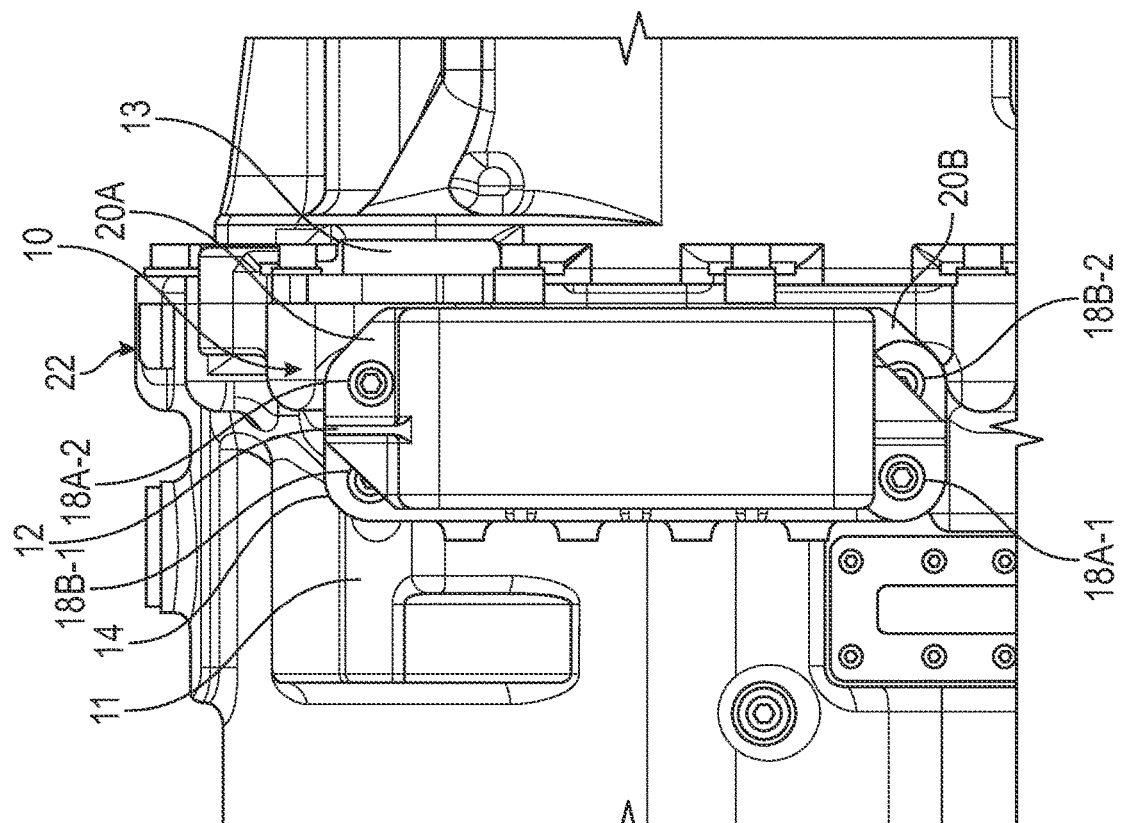
Figure 3:
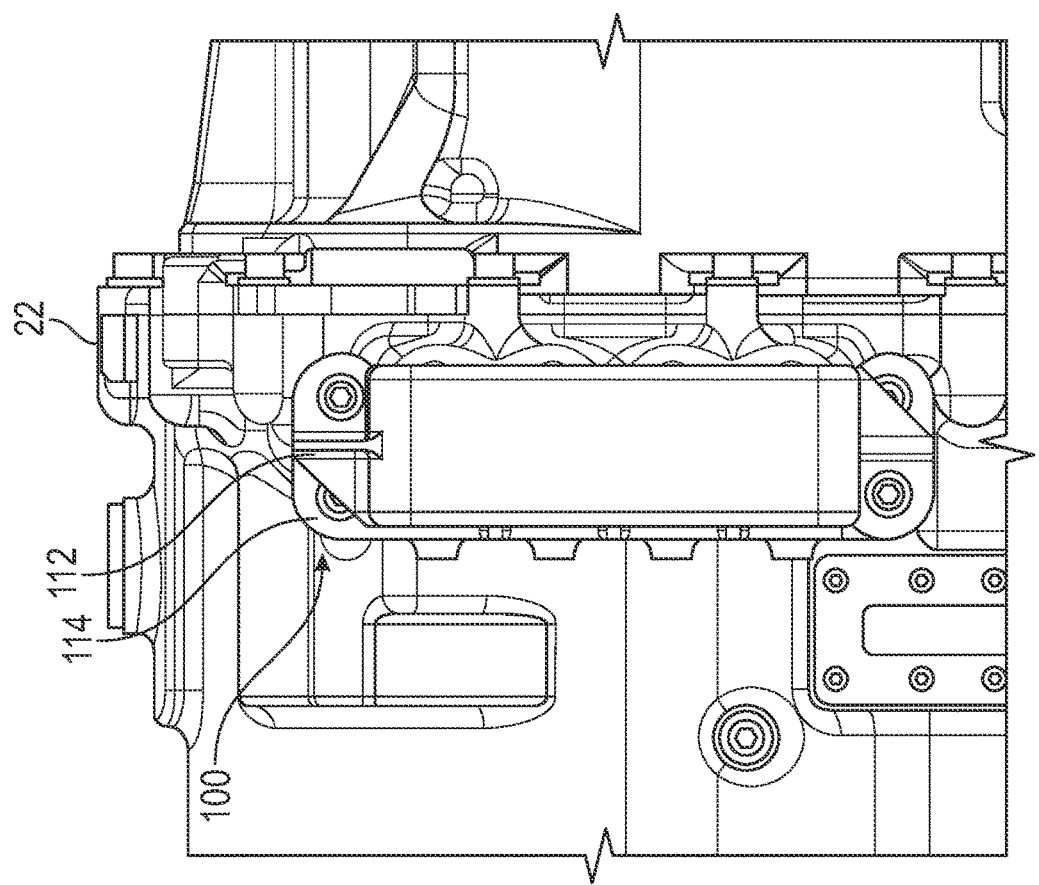
Figure 5:
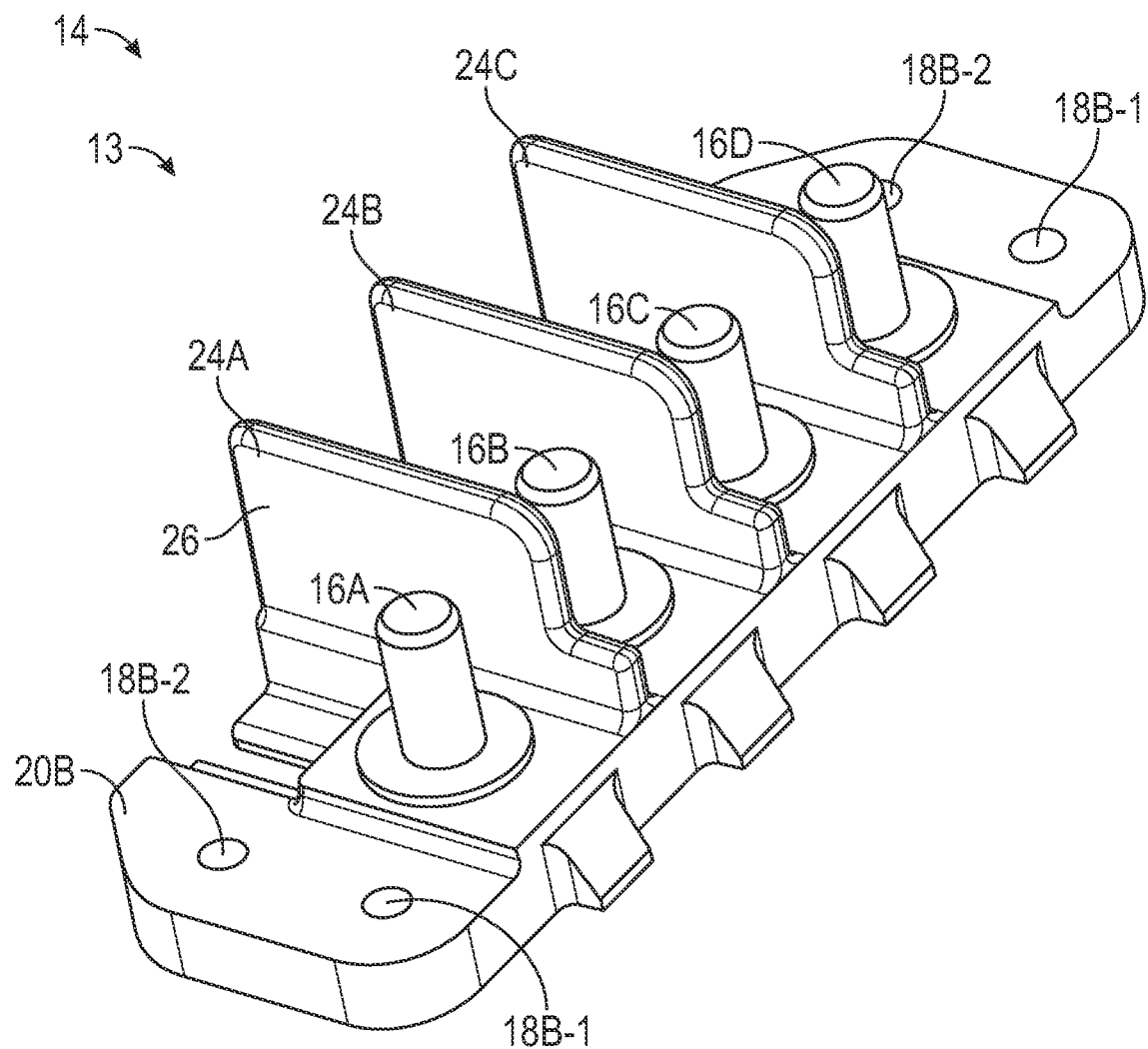
Figure 6:
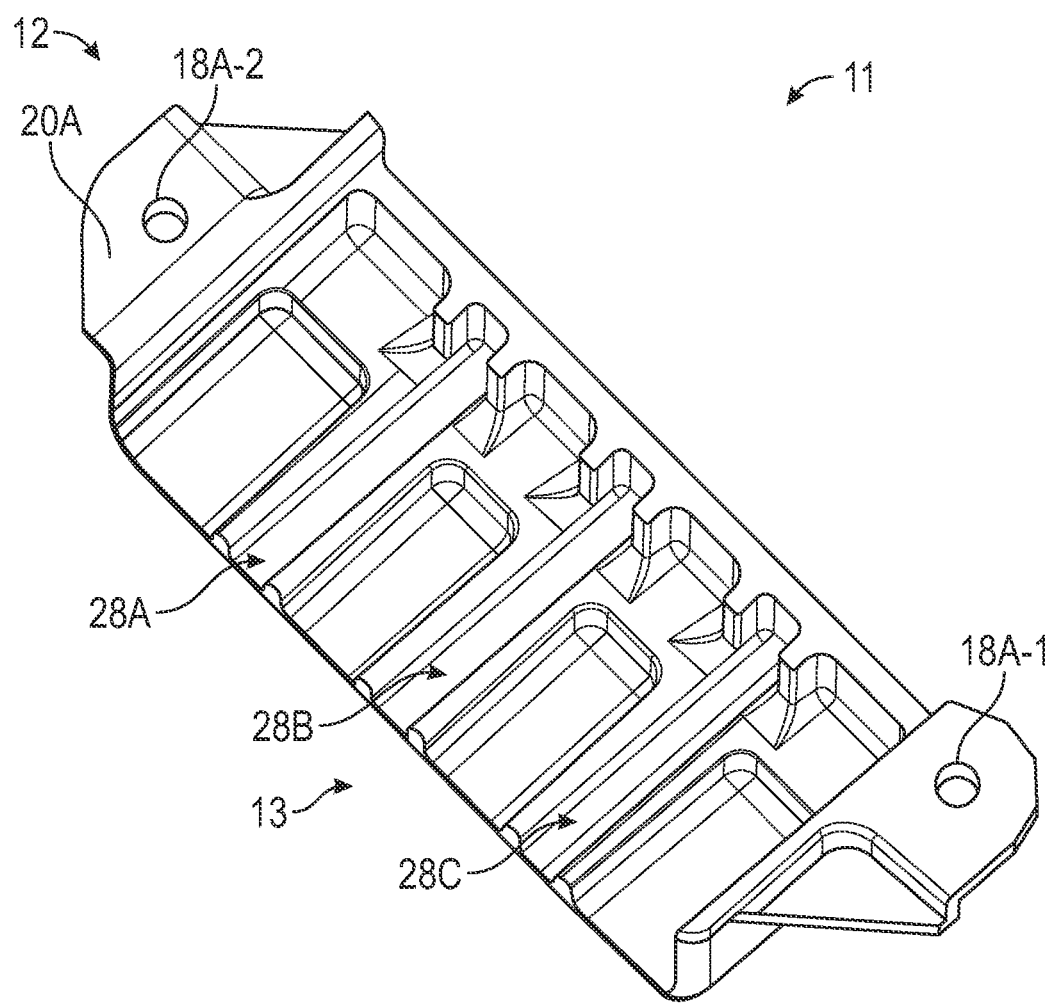
Figure 7:
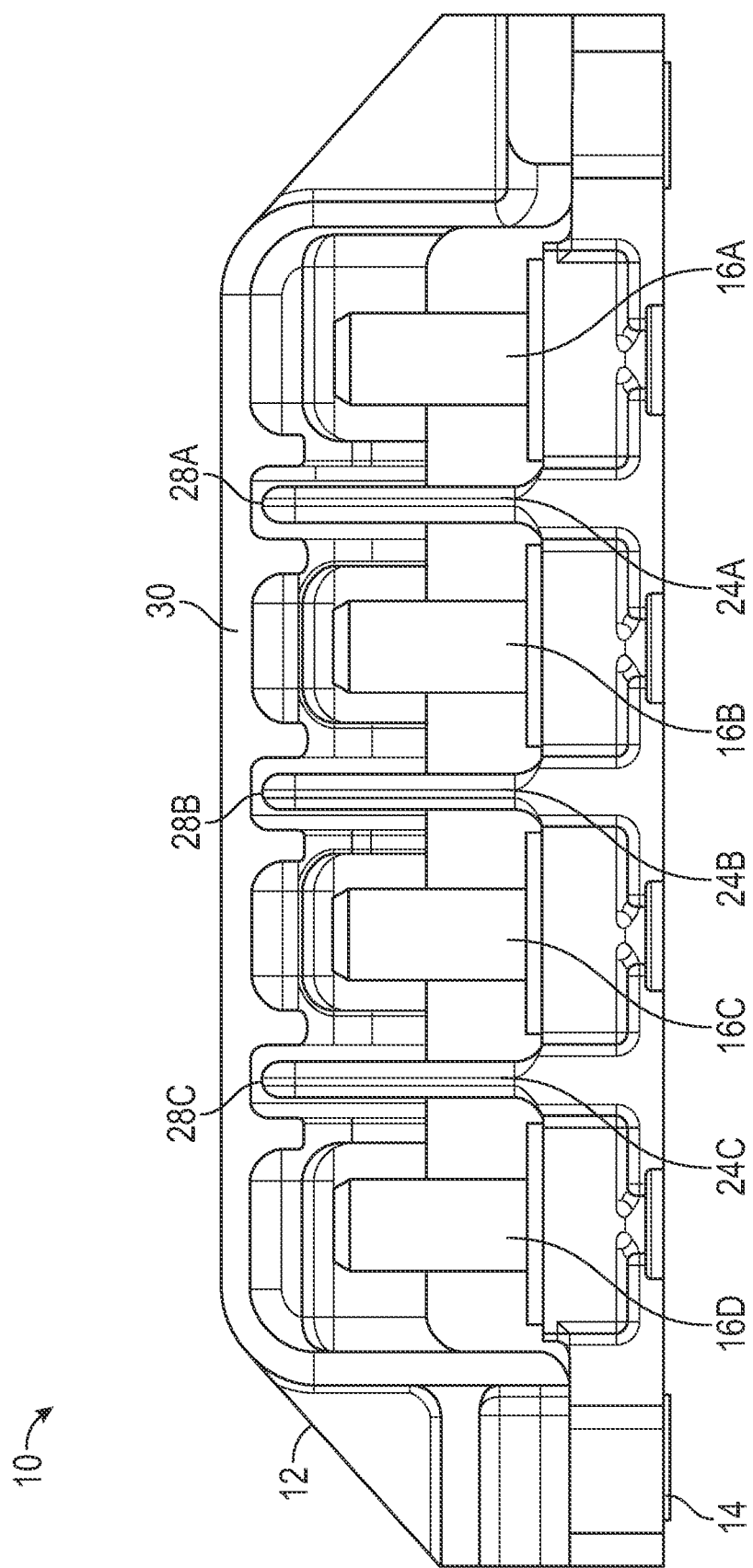
Figure 8:
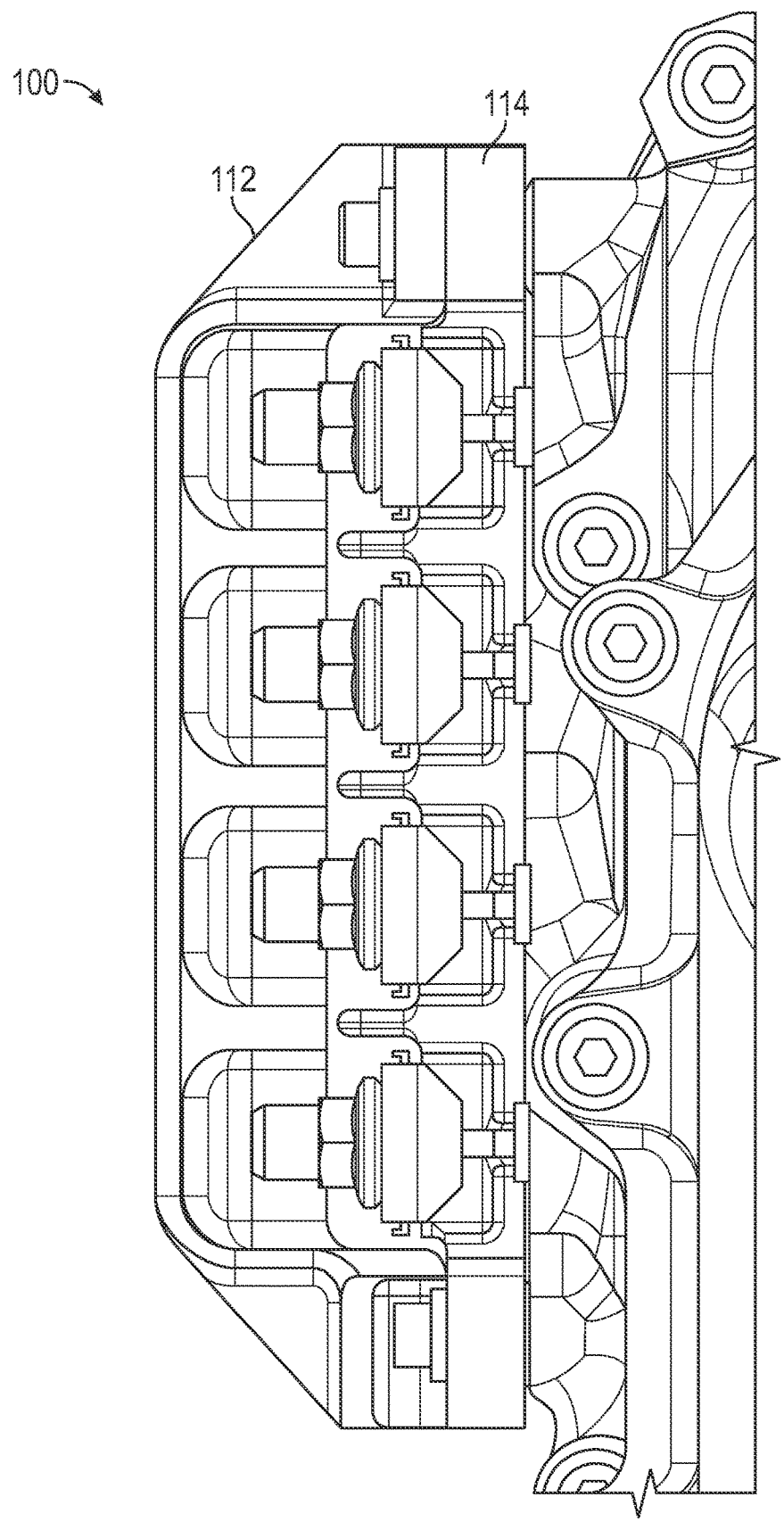
Figure 9:
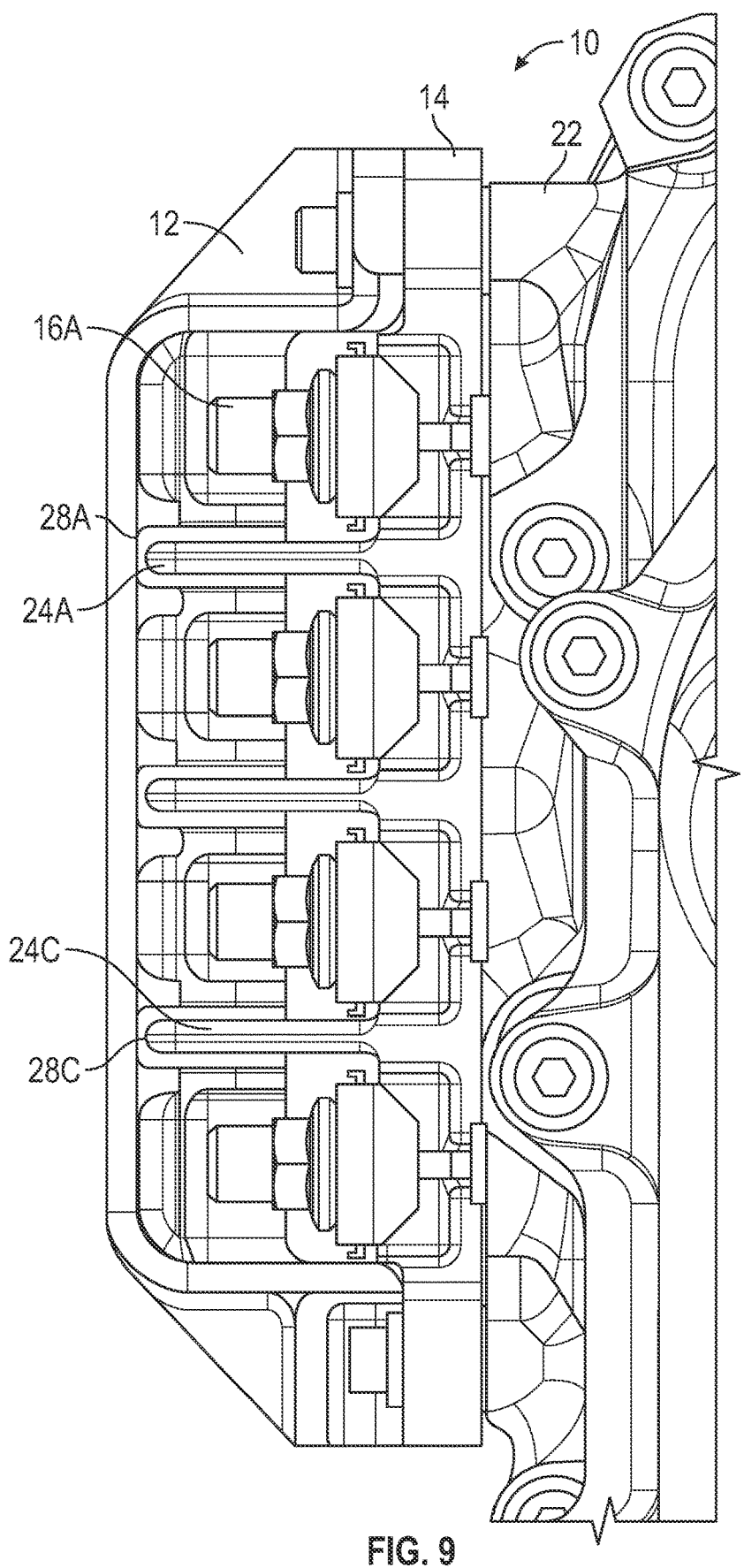
Figure 10:
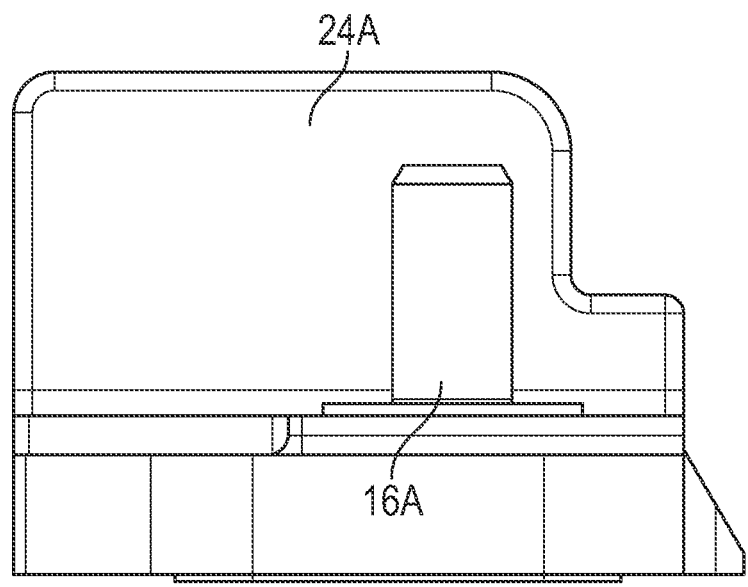
Figure 11:
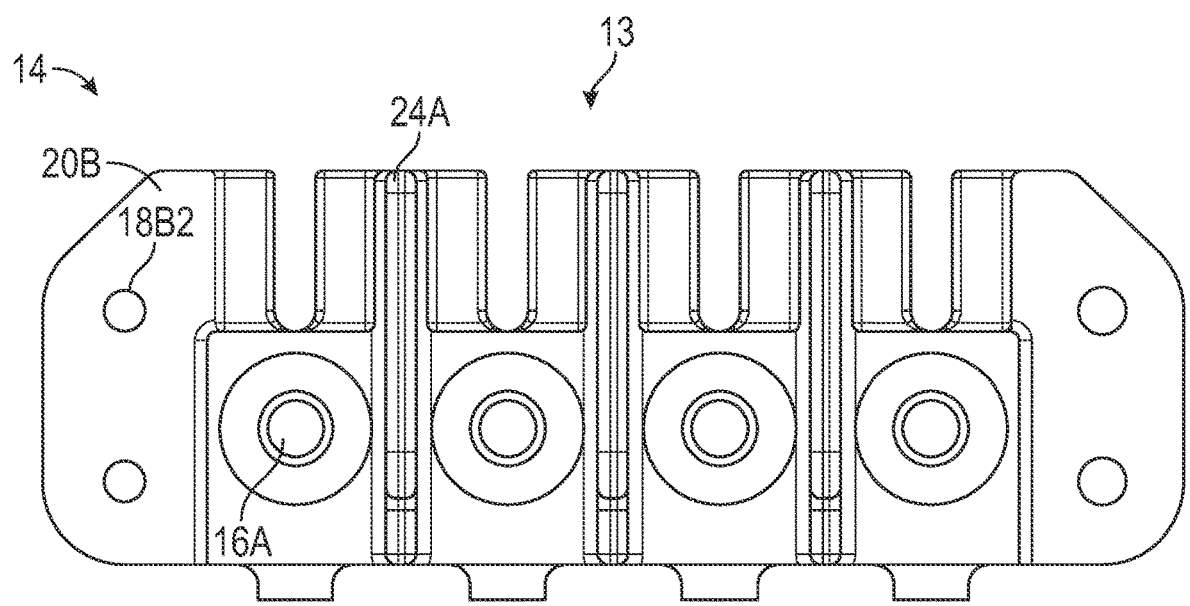
Figure 12:
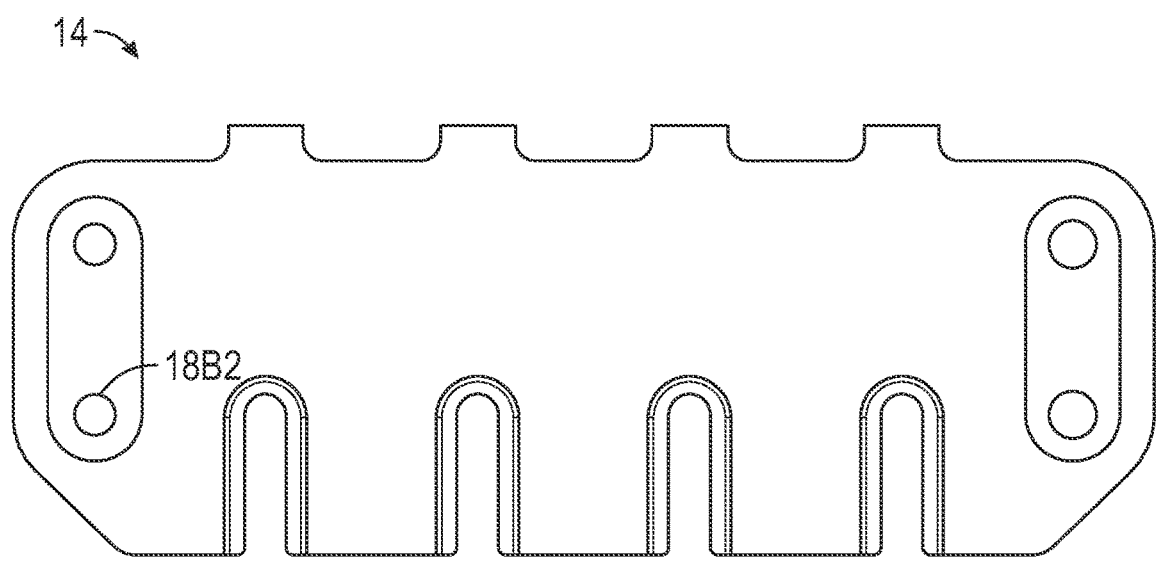
Figure 13:
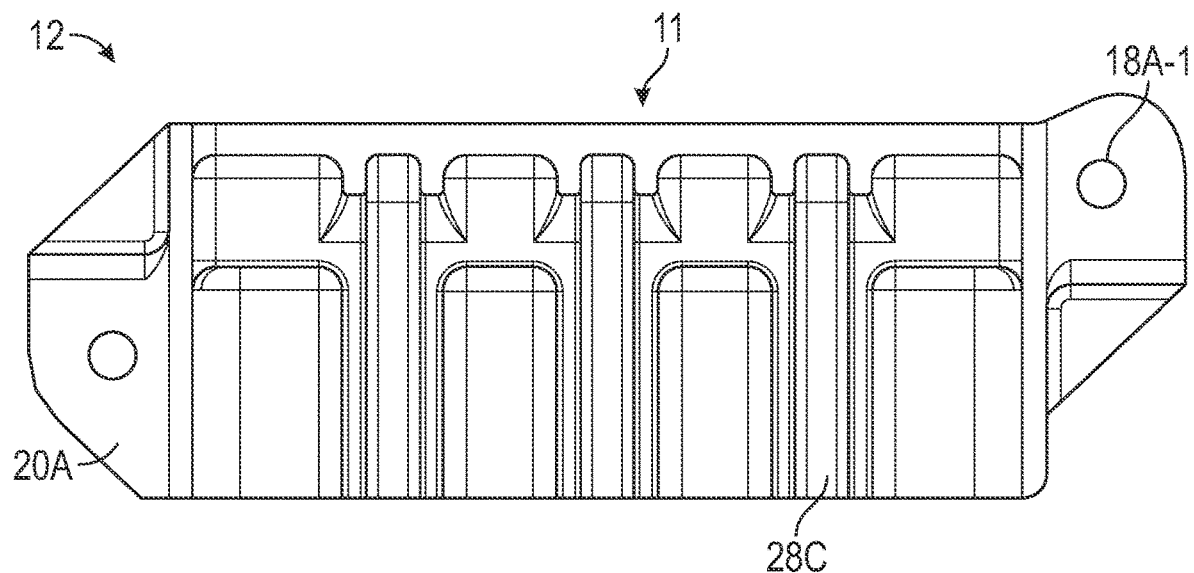
Figure 14:
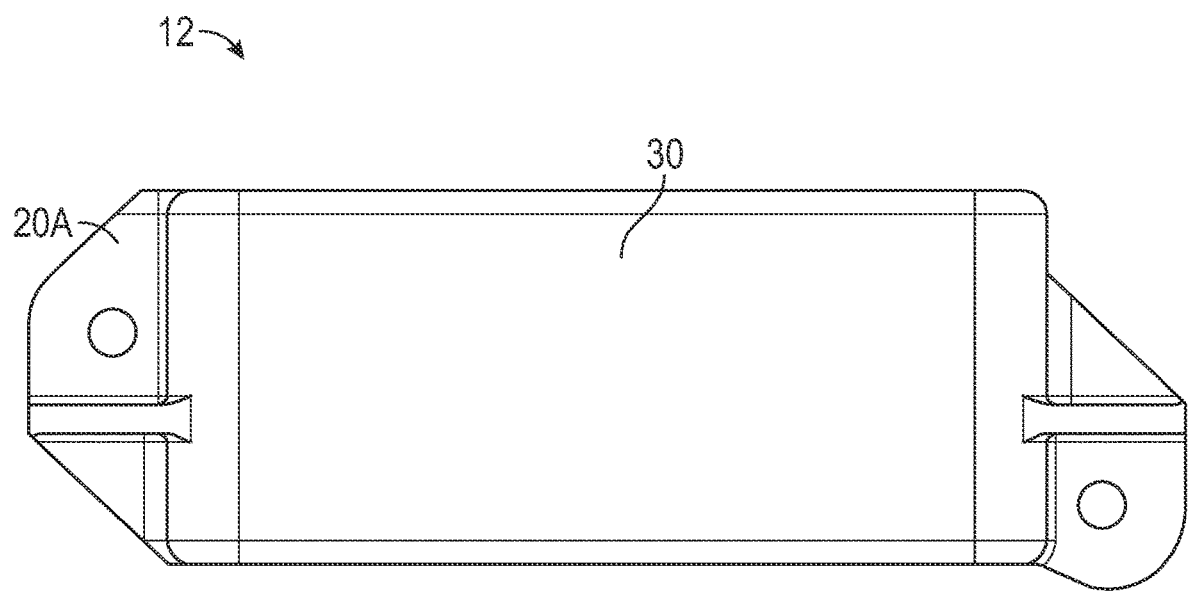

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a side perspective view of an example terminal block cover assembly, according to the present disclosure;

FIG. 2 is a side view of the terminal block cover assembly of FIG. 1;

FIG. 3 is a top view of a conventional terminal block cover assembly coupled to an electric generator;

FIG. 4 is a top view of the terminal block cover assembly of FIG. 1, the terminal block cover assembly being coupled to an electric generator;

FIG. 5 is a side perspective view of an example terminal block, according to the present disclosure;

FIG. 6 is a side perspective view of an example terminal block cover, according to the present disclosure;

FIG. 7 is another side view of the terminal block cover assembly of FIG. 1;

FIG. 8 is a side view of a conventional terminal block cover assembly coupled to an electric generator;

FIG. 9 is a side view of the terminal block cover assembly of FIG. 1, the terminal block cover assembly being coupled to an electric generator;

FIG. 10 is a side view of an example terminal block, according to the present disclosure;

FIG. 11 is top view of an example terminal block, according to the present disclosure;

FIG. 12 is a bottom view of an example terminal block, according to the present disclosure;

FIG. 13 is a bottom view of an example terminal block cover, according to the present disclosure; and FIG. 14 is a top view of an example terminal block cover, according to the present disclosure.

DETAILED DESCRIPTION

The example embodiments disclosed herein are illustrative of terminal block cover assemblies for electric generators, and systems of the present disclosure and methods/techniques thereof. It should be understood, however, that the disclosed embodiments are merely examples of the present disclosure, which may be embodied in various forms. Therefore, details disclosed herein with reference to example terminal block cover assemblies and associated processes/techniques of fabrication/assembly and use are not to be interpreted as limiting, but merely as the basis for teaching one skilled in the art how to make and use the systems/assemblies and/or alternative systems/assemblies of the present disclosure.

The present disclosure provides for terminal block cover assemblies for electric generators, and related methods of fabrication and use. More particularly, the present disclosure provides for terminal block cover assemblies for generators for aircraft or the like, with the terminal block cover assemblies having electrical arcing mitigation features and structures, and related methods of fabrication and use.

As noted, current practice provides that some conventional terminal block and cover designs can have issues with electrical arcing events (e.g., in environments where de-icing fluid is used in the engine cowl), and de-icing fluid can cause contamination build up that can lead to electrical arcing (e.g., at exposed areas of adjacent feeder cables).

FIG. 1 is a side perspective view of an example terminal block cover assembly 10 of the present disclosure. In general, terminal block cover assembly 10 is a terminal block cover assembly 10 for electric generators 22 (FIG. 4). More particularly, terminal block cover assembly 10 is a terminal block cover assembly 10 for generators 22 for aircraft or the like (e.g., a variable frequency generator 22 for aircraft, or an integrated drive generator 22 for aircraft, or a variable speed constant frequency generator 22 for aircraft), with the terminal block cover assembly 10 having electrical arcing mitigation features and structures, as discussed further below. In example embodiments, terminal block cover assembly 10 can be utilized to reduce electrical arcing events in environments where de-icing fluid is used in the engine cowl.

As shown in FIG. 1, the terminal block cover assembly 10 includes a terminal block cover 12 and a terminal block 14. Example terminal block 14 and cover 12 of assembly 10 each extend from a first side 11 to a second side 13, and extend from a first end 15 to a second end 17.

In general, the terminal block 14 provides a connection point from the generator 22 to the aircraft. There are four feeder cables that connect to the four terminal block studs 16A-16D. The feeder cables carry the electrical power to the aircraft's power distribution system to be used for various electrical loads. The terminal block 14 and cover 12 can be used to electrically isolate the different phases and the neutral connections from one another. They also isolate them from the generator 22 housing and surrounding components in the engine cowl.

In example embodiments, the terminal block cover 12 is a molded plastic component with features used to mate with the terminal block 14. The terminal block 14 is a molded plastic component with four terminal block studs 16A-16D (e.g., metal studs 16A-16D) that are molded in place. These are used for the connection to the aircraft feeder cables.

The relative position of the terminal block 14 and cover 12 can be controlled by mounting holes 18A-1 proximal to first side 11 and/or mounting holes 18A-2 proximal to second side 13 of cover 12, and by mounting holes 18B-1 proximal to first side 11 and/or mounting holes 18B-2 proximal to second side 13 of block 14 (FIGS. 1 and 4-6).

Example block 14 and cover 12 are designed to work as a set and be directly interchangeable with conventional designs or configurations as a set or an assembly 10.

Example terminal block 14 and cover 12 are configured and dimensioned to increase the dielectric capability of assembly 10. There are several improvements that provide a more robust electrical isolation system/configuration for assembly 10.

In example embodiments and as shown in FIG. 2, the overall extension length of cover 12 extending from first side 11 to second side 13 is increased via extension length section 20A of cover 12 (e.g., via added length section 20A of about 11.5 mm compared to conventional designs), and the overall extension length of block 14 extending from first side 11 to second side 13 is increased via extension length section 20B of block 14 (e.g., via added length section 20B of about 11.5 mm compared to conventional designs).

In some embodiments, the extension length section 20A of cover 12 extends a pre-determined distance (e.g., about 11.5 mm) from a mounting hole 18A-2 of cover 12 and toward the second side 13, and the extension length section 20B of block 14 extends a pre-determined distance (e.g., about 11.5 mm) from a mounting hole 18B-2 of block 14 and toward the second side 13.

The extension length sections 20A, 20B provide additional insulating material to separate the feeder cables and provide improved coverage for the aircraft feeder harness lugs. With conventional assemblies 100 (FIG. 4) having conventional cover 112 and conventional block 114, the corners of the lugs are not always fully insulated and can contribute to the arcing because they can be a concentrated point where an electrical charge arc can form. A side-by-side comparison of a conventional assembly 100 (FIG. 3) and an improved assembly 10 (FIG. 4) of the present disclosure installed in the generator 22 is shown in FIGS. 3 and 4. From the comparison in FIGS. 3 and 4, the additional protection (insulation) provided by the extension length sections 20A, 20B of improved assembly 10 is shown.

FIG. 5 is a side perspective view of an example terminal block 14 of the present disclosure. In example embodiments, the terminal block 14 includes a plurality of phase divider walls 24 (e.g., three phase divider walls 24A-C), with a first wall 24A positioned between studs 16A and 16B, and a second wall 24B positioned between studs 16B and 16C, and a third wall 24C positioned between studs 16C and 16D.

Similar to sections 20A and 20B, each wall 24A-C includes an extension length section 26 to increase dielectric clearance between the generator 22 out phases. More particularly and in example embodiments, each extension length section 26 of each wall 24A-C extends a pre-determined distance (e.g., about 11.5 mm) from a mounting hole 18B-2 position of block 14 and toward the second side 13.

FIG. 6 is a side perspective view of an example terminal block cover 12, according to the present disclosure.

In example embodiments and as shown in FIGS. 5-7, the cover 12 includes a plurality of phase divider mating grooves or cupped slots 28 (e.g., three phase divider mating grooves or cupped slots 28A-C), with a first groove/slot 28A positioned to mate with wall 24A, and with a second groove/slot 28B positioned to mate with wall 24B, and with a third groove/slot 28C positioned to mate with wall 24C. As such, the terminal block cover 12 includes the grooves or cupped slots 28A-C to accept the respective phase divider walls 24A-C of the terminal block 14, thereby increasing the dielectric gap between the phases of the feeder cables for assembly 10.

FIG. 7 is a side view showing the interface created by use of terminal block divider walls 24A-C and terminal block cover slots 28A-C.

A side-by-side comparison of a side view of a conventional assembly 100 (FIG. 8) and the improved assembly 10 (FIG. 9) of the present disclosure is shown in FIGS. 8-9. With assembly 10, the phase divider walls 24A-C have been extended (e.g., extending from block 14 toward cover surface 30 of cover 12—FIGS. 1 and 7) to prevent stud to stud arcing. The design of assembly 10 thereby substantially eliminates a line of sight path for arcing and increases the length the energy would have to travel, substantially eliminating the possibility of arcing due to the shape of the new path. The shape of the new path is more of a sawtooth path compared to a more direct straight path on the design of conventional assembly 100. The new path of assembly 10 thereby provides additional dielectric distance for charges/creepage to travel thus mitigating arcing events for assembly 10.

There are many benefits of the assemblies, systems and methods of the present disclosure, including, without limitation increased or improved dielectric protection for assembly 10; provides solutions for many field issues as discussed above and/or assembly 10 is directly replaceable as a set/assembly for existing or conventional hardware/assemblies.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A terminal block cover assembly comprising:
   a terminal block cover and a terminal block, the terminal block cover and the terminal block each extending from a first side to a second side, the terminal block cover having a first mounting hole configured to mount with respect to a first mounting hole of the terminal block, and the first mounting hole of the terminal block configured to mount with respect to an electric generator;
   a first terminal block stud extending from the terminal block, the first terminal block stud housed relative to the mounted terminal block cover and a first divider wall of the terminal block; and
   wherein the terminal block cover comprises an extension length section which extends a first distance from the first mounting hole of the terminal block cover and toward the second side, and wherein the mounted terminal block cover comprises an extension length section that extends the first distance from the first mounting hole of the terminal block and toward the second side;
   wherein the first divider wall extends the first distance from the first mounting hole of the terminal block and towards the second side.

2. The assembly of claim 1, wherein the electric generator is a variable frequency generator for aircraft, or an integrated drive generator for aircraft, or a variable speed constant frequency generator for aircraft.

3. The assembly of claim 1, wherein the first terminal block stud is configured to connect to a feeder cable that carries electrical power to a power distribution system of an aircraft.

4. The assembly of claim 1 further comprising a second terminal block stud extending from the terminal block, the second terminal block stud housed relative to the mounted terminal block cover and the first divider wall and a second divider wall of the terminal block.

5. The assembly of claim 4 further comprising a third terminal block stud extending from the terminal block, the third terminal block stud housed relative to the mounted terminal block cover and the second divider wall and a third divider wall of the terminal block; and
   a fourth terminal block stud extending from the terminal block, the fourth terminal block stud housed relative to the mounted terminal block cover and the third divider wall.

6. The assembly of claim 1, wherein a portion of the first divider wall extends from the terminal block and toward a cover surface of the mounted terminal block cover to electrically isolate the first terminal block stud.

7. The assembly of claim 1, wherein the mounted terminal block cover includes a first mating groove, the first mating groove configured to mate with a portion of the first divider wall of the terminal block.

8. The assembly of claim 4, wherein the mounted terminal block cover includes a first mating groove, the first mating groove configured to mate with a portion of the first divider wall of the terminal block; and
   wherein the mounted terminal block cover includes a second mating groove, the second mating groove configured to mate with a portion of the second divider wall of the terminal block.

9. The assembly of claim 1, wherein the terminal block cover is a molded plastic component, and the terminal block is a molded plastic component, and the first terminal block stud comprises metal.

10. A method for fabricating a terminal block cover assembly comprising:
   providing a terminal block cover and a terminal block, the terminal block cover and the terminal block each extending from a first side to a second side, with a first terminal block stud extending from the terminal block;
   mounting a first mounting hole of the terminal block with respect to an electric generator;
   mounting a first mounting hole of the terminal block cover with respect to the first mounting hole of the terminal block to house the first terminal block stud relative to the terminal block cover and a first divider wall of the terminal block; and
   wherein the terminal block cover comprises an extension length section which extends a first distance from the first mounting hole of the terminal block cover and toward the second side, and wherein the mounted terminal block comprises an extension length section extends the first distance from the first mounting hole of the terminal block and toward the second side to electrically isolate the housed first terminal block stud;
   wherein the first divider wall extends the first distance from the first mounting hole of the terminal block and toward the second side.

11. The method of claim 10, wherein the electric generator is a variable frequency generator for aircraft, or an integrated drive generator for aircraft, or a variable speed constant frequency generator for aircraft.

12. The method of claim 10 further comprising connecting the first terminal block stud to a feeder cable that carries electrical power to a power distribution system of an aircraft.

13. The method of claim 10 further comprising a second terminal block stud extending from the terminal block, the second terminal block stud housed relative to the mounted terminal block cover and the first divider wall and a second divider wall of the terminal block.

14. The method of claim 13 further comprising a third terminal block stud extending from the terminal block, the third terminal block stud housed relative to the mounted terminal block cover and the second divider wall and a third divider wall of the terminal block; and
   a fourth terminal block stud extending from the terminal block, the fourth terminal block stud housed relative to the mounted terminal block cover and the third divider wall.

15. The method of claim 10, wherein a portion of the first divider wall extends from the terminal block and toward a cover surface of the mounted terminal block cover to electrically isolate the first terminal block stud.

16. The method of claim 10, wherein the mounted terminal block cover includes a first mating groove, the first mating groove configured to mate with a portion of the first divider wall of the terminal block.

17. The method of claim 13, wherein the mounted terminal block cover includes a first mating groove, the first mating groove configured to mate with a portion of the first divider wall of the terminal block; and
   wherein the mounted terminal block cover includes a second mating groove, the second mating groove configured to mate with a portion of the second divider wall of the terminal block.

18. The method of claim 10, wherein the terminal block cover is a molded plastic component, and the terminal block is a molded plastic component, and the first terminal block stud comprises metal.

\* \* \* \* \*